(12) United States Patent
Cutler et al.

(10) Patent No.: US 6,454,941 B1
(45) Date of Patent: Sep. 24, 2002

(54) GRAVITY-FLOW WATER FILTRATION DEVICE

(75) Inventors: Willard A. Cutler, Big Flats, NY (US); David L. Hickman, Big Flats, NY (US); Stanley D. Solsky, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/461,796

(22) Filed: Dec. 15, 1999

Related U.S. Application Data

(60) Provisional application No. 60/112,575, filed on Dec. 17, 1998.

(51) Int. Cl.[7] .............................................. B01D 27/14
(52) U.S. Cl. ........................ 210/266; 210/282; 210/472
(58) Field of Search ............................. 210/257.1, 259, 210/266, 282, 257.2, 472

(56) References Cited

U.S. PATENT DOCUMENTS

| | | | |
|---|---|---|---|
| 4,329,162 A | 5/1982 | Pitcher, Jr. ................... | 55/523 |
| 4,428,758 A | 1/1984 | Montierth .................... | 55/523 |
| 4,540,489 A | 9/1985 | Barnard ....................... | 210/287 |

(List continued on next page.)

FOREIGN PATENT DOCUMENTS

| | | | |
|---|---|---|---|
| EP | 0 349 315 | * | 1/1990 |
| EP | 0 745 416 | | 12/1996 |
| EP | 0 792 676 | | 9/1997 |
| GB | 2 197 647 | | 3/1990 |
| WO | WO 96/31440 | | 10/1996 |

Primary Examiner—Ivars Cintins
(74) Attorney, Agent, or Firm—Kees van der Sterre

(57) ABSTRACT

A replaceable gravity-flow cyst-reducing water filter cartridge for placement in a water filter carafe, comprising a filter cartridge housing with a cap having a plurality of untreated water inlet ports, wherein the cap is sealingly attached to a top rim of the housing. The filter housing further comprises a gooseneck conduit that is connected to a lower region of the filter housing, with the gooseneck conduit having at one end a treated water outlet port that opens into a side surface of the filter housing. The filter housing also includes a packed bed of ion-exchange resin that is disposed in an upper region of the filter housing and a high surface area cyst-reducing filter element that is disposed in the lower region of the filter housing. The filter element provides at least 99.95% removal of 3–4 $\mu$m particles when tested in accordance with NSF standard 53, Drinking Water Treatment Units—Health Effects (September 1997). A bottom surface of the ion-exchange resin is in full contact with one side of a bottom screen, which is attached at the periphery to the side surface of the housing. The filter housing further has a first chamber separating the packed bed of ion-exchange resin from the cyst-reducing filter element and a second chamber proximate to the bottom surface of the filter housing, which is in fluid communication with the gooseneck conduit. The housing also includes an air vent conduit that is connected to the upper region of the filter housing, wherein the air vent conduit has an entry end that opens into the first chamber and an exit end that opens to the outside of the housing. The exit end is positioned above the treated water outlet port of the gooseneck conduit and the exit end is further covered with a hydrophobic membrane. The packed bed of ion-exchange resin and the cyst-reducing filter element each correspond in shape to the shape of the filter housing.

37 Claims, 9 Drawing Sheets

U.S. PATENT DOCUMENTS

| | | | |
|---|---|---|---|
| 4,781,831 A | 11/1988 | Goldsmith | 210/247 |
| 4,894,160 A | 1/1990 | Abe et al. | 210/510.1 |
| 4,895,648 A * | 1/1990 | Hankammer | 210/474 |
| 4,969,996 A * | 11/1990 | Hankammer | 210/282 |
| 5,009,781 A | 4/1991 | Goldsmith | 210/247 |
| 5,061,367 A * | 10/1991 | Hatch et al. | 210/282 |
| 5,114,581 A | 5/1992 | Goldsmith et al. | 210/650 |
| 5,128,036 A | 7/1992 | Svensson | 210/264 |
| 5,198,007 A | 3/1993 | Moyer et al. | 55/523 |
| 5,268,093 A * | 12/1993 | Hembree et al. | 210/266 |
| 5,451,444 A | 9/1995 | DeLiso et al. | 428/116 |
| 5,552,057 A * | 9/1996 | Hughes et al. | 210/282 |
| 5,597,617 A | 1/1997 | DeLiso et al. | 427/228 |
| 5,989,424 A * | 11/1999 | Serenko et al. | 210/282 |

* cited by examiner

GRAVITY-FLOW WATER FILTRATION DEVICE

This application claims the benefit of U.S. Provisional Application No. 60/112,575, filed Dec. 17, 1998, entitled "Gravity-Flow Water Filtration Device", by Cutler et al.

FIELD OF THE INVENTION

The present invention relates to water filtration devices, which include a cyst-reducing water filter capable of reducing parasites and other impurities in drinking water and yet capable of delivering a substantial water flow rate at relatively low (gravity-assisted or gravity-flow) water pressures. While the invention may be used in other types of water filtration devices, it is especially suited for use in gravity-flow water carafes, and will be particularly described in that connection.

BACKGROUND OF THE INVENTION

Until recently, water filter carafes of commercially available design have not been capable of parasite reduction, which requires much finer filtration. Nor have they been effective for the significant reduction of organic chemicals, pesticides and insecticides, which requires more carbon. While such additional removal attributes are desirable, they have not been technically feasible in the filter sizes required and at the filter cost currently available in the market. In addition to the concerns about drinking water taste and odor, consumers are beginning to be more concerned with the quality of drinking water, thus increasing the demand for gravity-flow filter carafes. This is because such water filter carafes are relatively low in cost and operate in a simple manner. Water from a tap is simply poured into the top of the filtration unit and is allowed to flow through a replaceable filter cartridge to a treated water reservoir for later use.

A typical commercially available cyst-reducing water filter cartridge consists of a filter housing which contains a packed bed mixture of ion-exchange resin for the removal of unwanted ions, for example, lead, copper, and hard water ions, as well as carbon granules for the removal of adsorbable/catalyzable constituents such as chlorine and undesirable tastes and odors. Further, the filter housing contains a high surface area cyst-reducing filter element that is capable of removing harmful parasites and dirt that are present in water from a municipal water source. Without the cyst-reducing filter element, the housing containing the packed bed mixture that is commercially available for use in gravity-flow water carafes typically have physical volumes on the order of 165 cm$^3$ (10 in$^3$). This suggests that a filter incorporating the additional cyst function using the current designs would require more volume than that mentioned above. Gravity cyst-reducing filters should be able to achieve the production of a reasonable quantity of filtered water in a reasonable time, preferably, approximately 1 liter in less than 12 minutes.

Although filter designs and materials capable of cyst reduction exist, significant problems remain concerning appropriate methods and designs for incorporating such filters into effective, gravity-assisted water carafe purification systems. In order to sustain adequate flow rates throughout the life of the filter, the design must be such that air entrapment within the filter must be minimized. In addition, the design should be such that either a hydrophilic or a hydrophobic microporous cyst-reducing filter element can be used to sustain maximum flow rates. Maximum flow rates are achieved when water has displaced the air in the filter pores. This displacement of air from the pores and its replacement with water can be referred to as priming and when this displacement process is complete the filter is referred to as being in the primed state. The maximum flow rate is achieved when the filter element remains in the primed state. The filter cartridge design should allow the cyst-reducing filter element to remain in the primed state, that is, fully submerged at all times. The inventive combination of a filter cartridge design which allows both proper cartridge venting and which keeps the filter primed is essential to a successful filter.

A design in which only one of the two factors is present will reduce flow. Designs which only allow the filter to remain in its primed state, but which neglect venting promote the development of air locks beneath the packed bed of ion-exchange resin and/or under the cyst-reducing filter element, which significantly diminishes or stops the water flow rate. Air locks can come from two sources, entrapped air bubbles and dissolved air. The tap water out of a faucet that is introduced into the filters is typically less than 55° F. Moreover, the tap water usually is directed first through an aerator which mixes air with the water and creates water that is full of bubbles. Some air enters the filter cartridge in the form of these bubbles, which penetrate into the filter cartridge and can coalesce with other bubbles to form larger bubbles which cannot get back out, thus, forming air locks within the cartridge. Secondly, air can enter and move through the cartridge in the form of dissolved oxygen and nitrogen. As the water temperature reaches room temperature or above the temperature of the original tap water, the solubility of these two gases decreases and the gases come out of the water, thus, forming air locks in the filter cartridge. Furthermore, designs which allow venting, but do not keep the filter in the primed state do not produce the maximum flow of water through the cartridge.

In light of the foregoing, it is desirable to provide a water filtration device that can provide a reduction of very fine particulate biological cysts and other impurities from drinking water. Also, it is desirable to provide a water filtration device that can deliver substantial volumes of filtered water at relatively low water pressures. In addition, it is desirable to provide a water filtration device that maintains the cyst-reducing filter element in a primed condition and prohibits the development of air locks, thus, providing an adequate filter flow rate. Furthermore, it is desirable to provide a water filtration device that promotes the removal of any air trapped between the packed bed of ion-exchange resin and the cyst-reducing filter element and prevents any water from bypassing the cyst-reducing filter element. Finally, it is desirable to provide a water filtration device that is replaceable and cost effective in the market place.

SUMMARY OF THE INVENTION

Accordingly, the present invention is directed to a water filtration device that substantially obviates one or more of the limitations and disadvantages of the related art. The principal advantage of the present invention is the provision of an arrangement which overcomes the limitations and disadvantages of the described prior arrangements. Additional features and advantages of the invention will be set forth in the description that follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages and in accordance with the purpose of the invention, as embodied and broadly described, the water filtration device is a replaceable cyst-reducing water filter cartridge for use in a water filter carafe. In accordance with the present invention, the filter cartridge includes a housing that further comprises a top rim, a side surface, a bottom surface, and a cap that is sealingly attached to the top rim, wherein the cap comprises a plurality of untreated water inlet ports. The filter housing further comprises a gooseneck conduit that is connected to a lower region of the filter housing, wherein the gooseneck conduit has at one end a treated water outlet port that opens into the side surface of the filter housing. The filter housing further includes a packed bed of ion-exchange resin that is disposed in the filter housing and a high surface area cyst-reducing filter element that is also disposed in the filter housing. The filter element provides at least 99.95% removal of 3–4 $\mu$m particles when tested in accordance with NSF standard 53, Drinking Water Treatment Units—Health Effects (September 1997). A bottom surface of the packed bed of ion-exchange resin is in full contact with one side of a bottom screen that is attached at the periphery to the side surface of the housing. The other side of the bottom screen forms a ceiling in a first chamber. The first chamber separates the packed bed of ion-exchange resin from the cyst-reducing filter element. The housing further comprises a second chamber proximate to the bottom surface of the filter housing, wherein the second chamber is in fluid communication with the gooseneck conduit. The housing also includes an air vent conduit that is connected to the upper region of the filter housing, wherein the air vent conduit has an entry end that opens into the first chamber and an exit end that opens to the outside of the housing. The exit end is positioned above the treated water outlet port of the gooseneck conduit and the exit end is further covered with a hydrophobic membrane. In one embodiment of the invention, the packed bed of ion-exchange resin is disposed within the upper region of the housing and the cyst-reducing filter element is disposed within the lower region of the housing, wherein the bottom screen is substantially parallel to the cyst-reducing filter element. Furthermore, in a preferred embodiment, the cyst-reducing filter element comprises a cellular honeycomb structure having a plurality of channels separated by porous channel walls, wherein the channels traverse the cyst-reducing filter element from a filter inlet end to a filter outlet end, and include a first plurality of channels open only at the inlet end and a second plurality of channels open only at the outlet end, and where the cellular honeycomb structure is made of ceramic. In an alternative embodiment, the cellular ceramic honeycomb structure further comprises activated carbon.

In another aspect of the invention, the cyst-reducing filter cartridge is provided where the bottom screen is attached to the housing in a slanted fashion, providing the first chamber with a low area underneath the ceiling at one end and a high area underneath the ceiling at an opposite end, and wherein the air vent conduit is disposed within the upper region and at a peripheral surface of the packed bed of ion-exchange resin, wherein the entry end of the air vent conduit opens into the high area underneath the ceiling of the first chamber, with the air vent conduit being on the same side of the housing as the gooseneck conduit. In yet another aspect of the invention, the cyst-reducing filter element is secured slantingly in the housing at a similar angle as the bottom screen.

Further yet, in another aspect of the invention, a cyst-reducing filter cartridge is provided that includes a bottom screen that has a convex shape with respect to a topmost surface of the cyst-reducing filter element, with the bottom screen providing the first chamber with a high area underneath the ceiling in the middle and a low area underneath the ceiling at the periphery, and wherein the air vent conduit is disposed in the middle of the packed bed of ion-exchange resin, with the entry end of the air vent conduit opening into the high area underneath the ceiling of the first chamber.

Furthermore, in yet another aspect of the invention, a cyst-reducing filter cartridge is provided that includes a packed bed of ion-exchange resin that is smaller in circumferential size than the filter housing, and where the packed bed of ion-exchange resin is surrounded by a resin holder screen that is water impermeable and is attached to the housing. Further, the bottom screen is concave in shape with respect to the topmost surface of the cyst-reducing filter element and is attached at the periphery to the bottom of the resin holder screen. The bottom screen is water permeable and provides the first chamber with a low area underneath the ceiling in the middle and a high area underneath the ceiling at the periphery.

In yet another embodiment of the invention, a cyst-reducing filter cartridge is provided that includes a packed bed of ion-exchange resin that is smaller in circumferential size than the filter housing, and where the packed bed of ion-exchange resin is surrounded by a resin holder screen that is water permeable and is attached to the housing. Further, the bottom screen is concave in shape with respect to the topmost surface of the cyst-reducing filter element and is attached at the periphery to the bottom of the resin holder screen. The bottom screen is water impermeable and provides the first chamber with a low area underneath the ceiling in the middle and a high area underneath the ceiling at the periphery. Further, the cartridge includes a water permeable screen conduit that traverses the center of the packed bed of ion-exchange resin. The water permeable screen conduit has an open end at the top that is adapted for receiving a stream of untreated water and an opposite closed end that is proximate to the bottom screen.

Furthermore, in yet another embodiment of the invention, a cap for sealing the top rim of a cyst-reducing filter cartridge is provided. The cap comprises a plurality of untreated water inlet ports that are located on both a raised top surface of the cap and along the bottom periphery of a side skirt extending from the cap. The cap further includes a baffle plate that is attached to the inside of the raised top surface of the cap, wherein approximately half the number of the untreated water inlet ports are located on each side of the baffle plate.

Finally, in another embodiment of the invention, a cyst-reducing water filtration device is provided that comprises the cyst-reducing filter cartridge in accordance with the present invention. The water filtration device further comprises a water filter carafe having a pour spout, and where the filter cartridge is mounted in a receptacle located in an untreated water reservoir of the filter carafe. the filter cartridge includes a housing that further comprises a top rim, a side surface, a bottom surface, and a cap that is sealingly attached to the top rim, wherein the cap comprises a plurality of untreated water inlet ports. The filter housing further comprises a gooseneck conduit that is connected to a lower region of the filter housing, wherein the gooseneck conduit has at one end a treated water outlet port that opens into the side surface of the filter housing. The filter housing further includes a packed bed of ion-exchange resin that is disposed in the filter housing and a high surface area cyst-reducing filter element that is also disposed in the filter housing. The filter element provides at least 99.95% removal of 3–4 $\mu$m particles when tested in accordance with NSF standard 53, Drinking Water Treatment Units—Health Effects (September 1997). A bottom surface of the packed bed of ion-exchange resin is in full contact with one side of a bottom screen that is attached at the periphery to the side surface of the housing. The other side of the bottom screen forms a ceiling in a first chamber. The first chamber separates the packed bed of ion-exchange resin from the cyst-reducing filter element. The housing further comprises a second chamber proximate to the bottom surface of the filter housing, wherein the second chamber is in fluid communication with the gooseneck conduit. The housing also includes an air vent conduit that is connected to the upper region of the filter housing, wherein the air vent conduit has an entry end that opens into the first chamber and an exit end that opens to the outside of the housing. The exit end is positioned above the treated water outlet port of the gooseneck conduit and the exit end is further covered with a hydrophobic membrane. The exit end of the air vent conduit and the treated water outlet port of the gooseneck conduit is positioned on an opposite side of the filter carafe from the pour spout.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrating embodiments of the invention, and together with the description serve to explain the objects, advantages, and principles of the invention.

DESCRIPTION OF THE PREFERRED EMBODIMENTS

The invention disclosed herein generally embodies the provision of a water filtration device containing a cyst-reducing water filter cartridge. More specifically, an aspect of the invention resides in providing a replaceable water filter cartridge that provides at least 99.95% removal of 3–4 $\mu$m particles when tested in accordance with NSF Standard 53, Drinking Water Treatment Units—Health Effects (September 1997) and provides an adequate filtration water flow rate at relatively low (gravity-assisted) water pressures. As used herein, the terms "gravity-flow" and "gravity-assisted" refer to the natural flow of water under the influence of the earth's gravitational forces. Furthermore, the term "cyst-reducing filter element" refers to a filter element that provides at least 99.95% removal of 3–4 $\mu$m particles when tested in accordance with NSF Standard 53, Drinking Water Treatment Units—Health Effects (September 1997). Furthermore, as used herein, the term "packed bed of ion-exchange resin" simply refers to a bed of resin that is formed when the ion-exchange resin settles into a defined space, such as a space within a filter cartridge housing.

Figure 1:
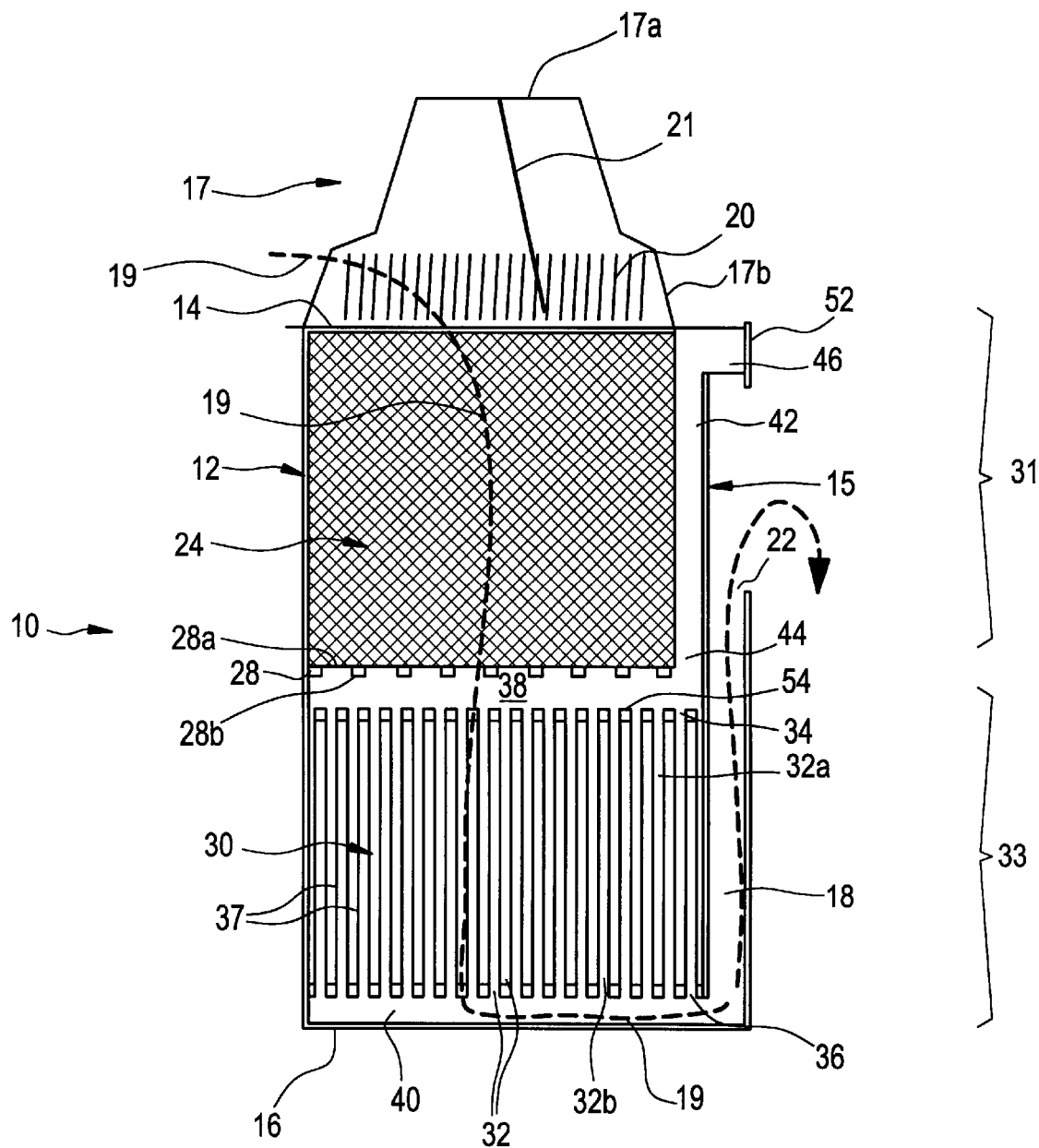
FIG. 1 is a schematic side view of a filter cartridge design in accordance with an embodiment of the present invention.

Reference will now be made in detail to the present preferred embodiments of the invention, examples of which are illustrated in the accompanying drawings. Turning to the drawings, like numerals indicate the same or similar elements in each of the several views. The drawings are not intended to indicate scale or relative proportions of the elements shown therein. FIGS. 1–6 depict the cyst-reducing filter cartridge of the present invention, which is designated generally by reference numeral 10. As shown in each of the FIGS. 1–6, the filter cartridge is enclosed in a filter housing 12, which has a top rim 14 and a bottom surface 16. Further, the top rim 14 includes a cap 17 that is sealingly attached to the top rim 14. As shown in FIGS. 7a and 7b, the cap 17 contains a plurality of untreated water inlet ports 20 which are located both on a raised top surface 17a of the cap 17 and along the bottom periphery of a side skirt 17b extending from the cap 17. The cap 17 is attached to the top rim 14 so that water can only enter the filter housing 12 through the plurality of untreated water inlet ports 20, mentioned above. Furthermore, as shown in FIG. 7b, the cap 17 has a baffle plate 21 attached to the raised top surface 17a in a manner, such that approximately half the number of the untreated water inlet ports 20 on the top of the cap are located on each side of the baffle plate 21. Additionally, as shown in FIGS. 1–6, the filter housing 12 further contains a gooseneck conduit 18 connected to a lower region 33 of the filter housing 12. The gooseneck conduit 18 has a treated water outlet port 22, at one end, which opens into a side surface 15 of the filter housing 12. A packed bed of ion-exchange resin 24 is disposed within an upper region 31 and proximate to the top rim 14 of the filter housing 12. The packed bed of ion-exchange resin 24 is bounded at the top by the cap 17, whereas, the packed bed of ion-exchange resin 24 is bounded at the bottom by one side 28a of a bottom screen 28. The opposite side of the bottom screen 28 forms a ceiling 28b in a first chamber 38. The first chamber 38, separates the packed bed of ion-exchange resin 24 from a high surface area cyst-reducing filter element 30. The high surface area cyst-reducing filter element 30 is secured within the lower region 33 of the filter housing 12 and proximate to the bottom surface 16 of the filter housing 12. In the preferred embodiment, the cyst-reducing filter element 30 is a cellular honeycomb structure having a plurality of channels 32 that are separated by porous channel walls 37, where each of the channels 32 traverse the cyst-reducing filter element 30 from a filter inlet end 34 to a filter outlet end 36, and include a first plurality of channels 32a open only at the filter inlet end 34 and a second plurality of channels 32b open only at the filter outlet end 36. In one embodiment, as shown in FIG. 1, the bottom screen 28 is substantially parallel to a topmost surface 54, that is the surface that has the open filter inlet ends 34 of the cyst-reducing filter element 30. Additionally, as shown in FIGS. 1–6, the filter cartridge housing 12 further includes a second chamber 40, which separates the cyst-reducing filter element 30 and the bottom surface 16 of the filter housing 12. Moreover, as shown in FIGS. 1–6, the filter inlet end 34 of the cyst-reducing filter element 30 is adjacent to the first chamber 38, whereas, the filter outlet end 36 is adjacent to the second chamber 40. Also, the second chamber 40 is in fluid communication with the end opposite the treated water outlet port 22 of the gooseneck conduit 18. Further, an air vent conduit 42 having an entry end 44 and an exit end 46 is connected to the upper region 31 of the filter housing 12. The entry end 44 opens into the first chamber 38, whereas, the exit end 46 of the air vent conduit 42 opens outside into the side surface 15 of the filter housing 12. As shown in FIG. 1, the exit end 46 of the air vent conduit is positioned above the treated water outlet port 22 of the gooseneck conduit 18, preferably proximate to the top rim 14 of the filter housing 12. Further, the treated water outlet port 22 of the gooseneck conduit 18 is positioned above the topmost surface 54 of the cyst-reducing filter element 30. The exit end 46 of the air vent conduit 42 is covered by a hydrophobic membrane 52, which is impermeable to water, but passes air.

The way that the filter cartridge 10 operates is that the filter cartridge 10 is placed in a receptacle of an untreated water reservoir of a filtration device, such as a water carafe (not shown). The filter cartridge is primed by partially filling the carafe pitcher with water. The reservoir with attached filter cartridge 10 is placed in the pitcher as in normal use. Water enters the treated water outlet port 22 of the gooseneck 18 and flows in a reverse manner through the cyst-reducing filter element 30 displacing air before it. This action also wets the resin bed 24 allowing it to swell in preparation for adsorption/exchange. Once the filter cartridge 10 has been primed, the cyst reducing element 30 remains immersed in water due to the design so that the cartridge 10 remains primed. This condition prevents air from getting trapped inside the cartridge 10, which in turn would diminish the water filtration flow rate. In order to prevent the filter cartridge 10 from losing its prime, the filter cartridge 10 of the present invention is provided with the gooseneck conduit 18, which has the treated water outlet port 22 located at the side surface 15 of the filter housing 12. In normal use, the unfiltered water from the tap enters through the untreated water inlet ports 20 located on the cap 17 of the filter housing 12 and passes sequentially, first, through the packed bed of ion-exchange resin 24, then through the first chamber 38, then through the cyst-reducing filter element 30 to the second chamber 40, and out through the treated water outlet port 22 of the gooseneck conduit 18 into a treated water reservoir located in the water carafe (not shown). The dotted line 19 in FIGS. 1–6 outlines the flow path of the water from the cap 17 to the treated water outlet port 22 of the gooseneck conduit 18. The configuration of the gooseneck conduit 18 and, in particular, the positioning of the treated water outlet port 22 is of significance. On one hand, the higher the placement of the treated water outlet port 22, the greater the force that is exerted on the air inside the filter housing 12, thus, increasing the rate at which the air can be vented. However, on the other hand, the higher the placement of the treated water outlet port 22, the smaller the pressure available for water flow. Additionally, the treated water outlet port 22 of the gooseneck conduit 18 is positioned above the level of the first chamber 38 to ensure that the water level within the filter cartridge housing 12 does not fall below the level of water in the cyst-reducing filter element 30, hence, preventing the cyst-reducing filter element 30 from losing its prime. Although the cyst-reducing filter element 30 can become temporarily uncovered during pouring, the filter element 30 does not lose its prime. In the preferred embodiment, the treated water outlet port 22 is positioned at least a centimeter above the topmost surface 54 of the cyst-reducing filter element 30. Also, in the preferred embodiment in the case where the high surface area cyst filter does not contain carbon, the packed bed of ion-exchange resin 24 further includes carbon granules.

Figure 8A:
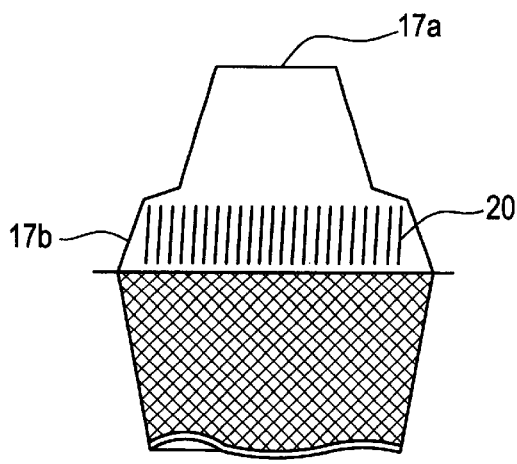
FIGS. 8a–c are schematic side views showing the cap design without a baffle plate in accordance with an embodiment of the present invention.
Figure 8D:
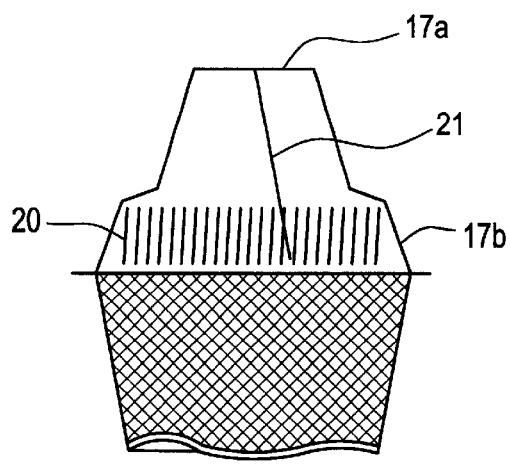
FIGS. 8d –f are schematic side views showing the cap design with a baffle plate in accordance with an embodiment of the present invention.
Figure 8B:
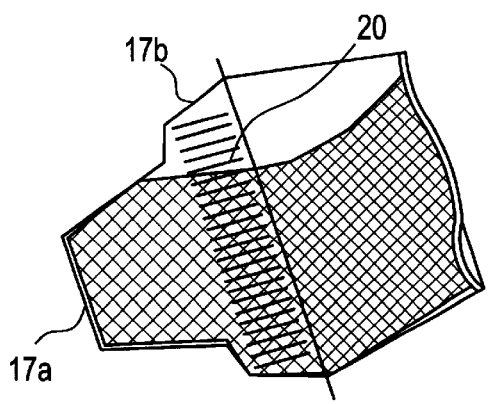
Figure 8E:
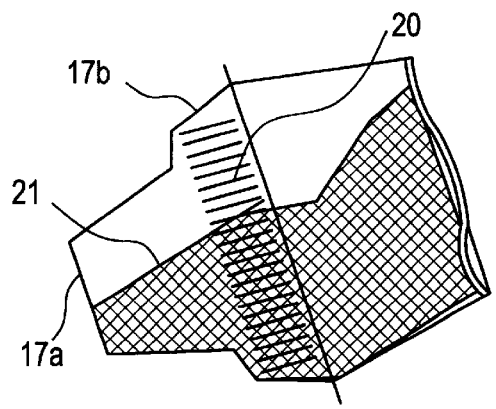
Figure 8C:
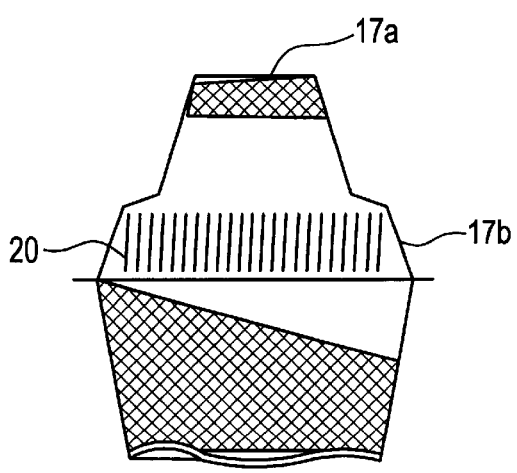
Figure 8F:
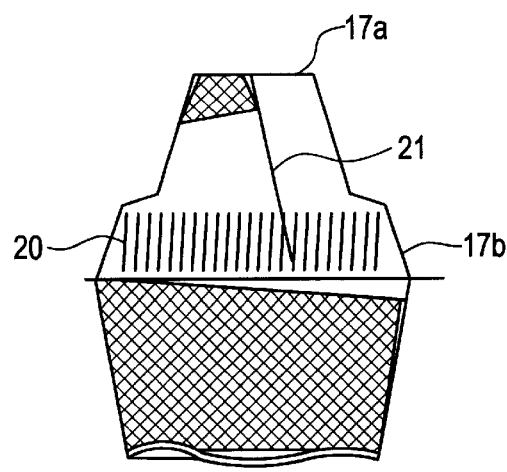

Also, of significance, is the baffle plate 21 incorporated in the cap 17 of the present invention. In particular, as shown in FIGS. 8a–8c, when a commercially available water carafe (not shown) having a cap 17 that does not include a baffle plate 21 is tilted during pouring, the ion-exchange resin 24 tends to flow into the cap 17 and occasionally even after the carafe is returned to its upright position, some of the ion-exchange resin 24 remains lodged in the raised top surface 17a of the cap 17, blocking all of the untreated water inlet ports 20 on the raised top surface 17a, as shown in FIG. 8c. However, as shown in FIGS. 8d–8f, when a water carafe (not shown) having a cap 17 with a baffle plate 21 attached to the inside of the cap 17 is tilted during pouring, the ion-exchange resin 24 only flows into one side of the baffle plate 21. Further, after the carafe is returned to its upright position, only the untreated water inlet ports 20 on the side of the baffle plate 21 that encountered the ion-exchange resin 24 tend to be blocked, as shown in FIG. 8f, thus, preventing any significant reduction in the water filtration rate caused by blocked untreated water inlet ports 20.

Figure 2:
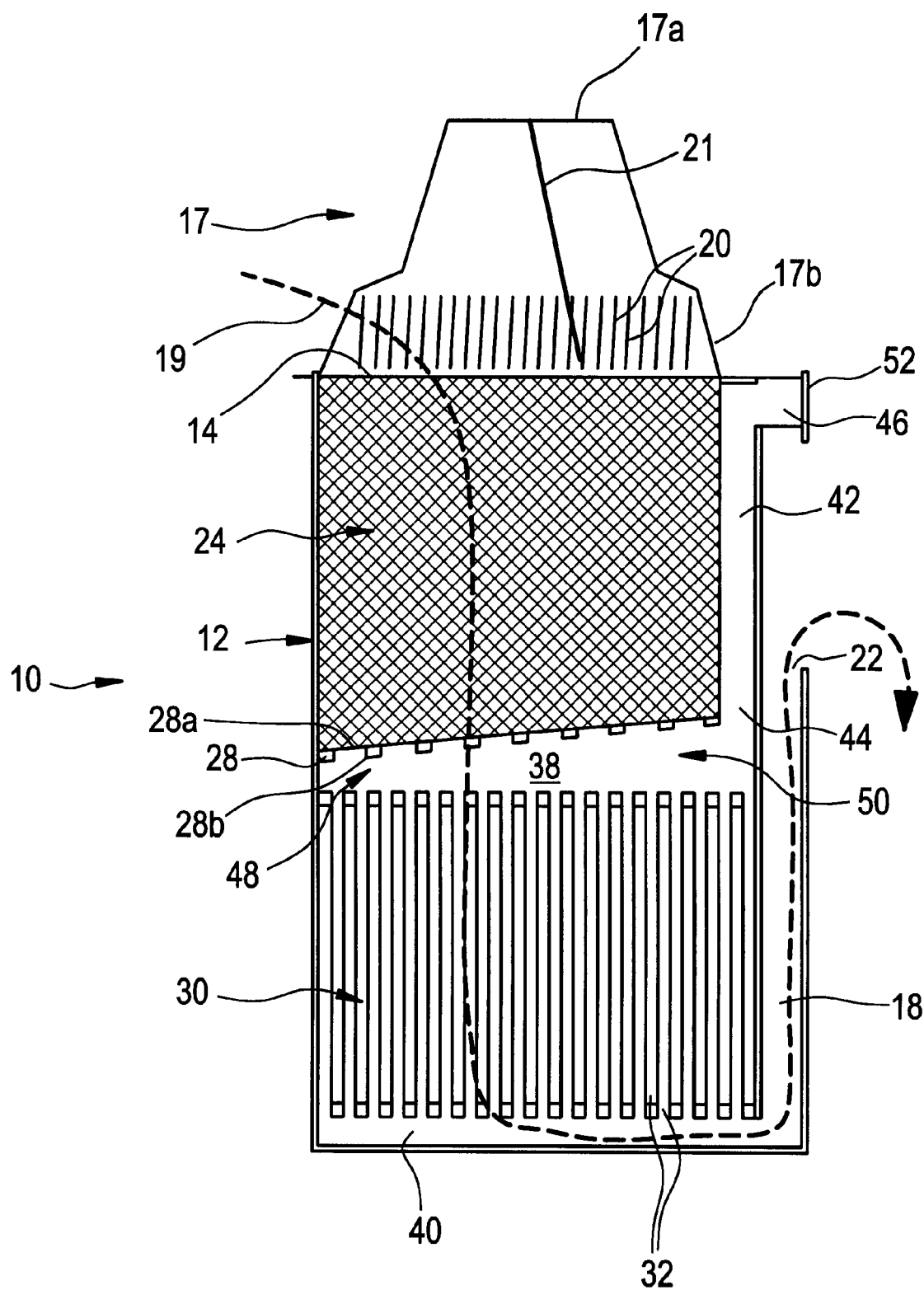
FIG. 2 is a schematic side view of a filter cartridge design illustrating an embodiment of the present invention.
Figure 3:
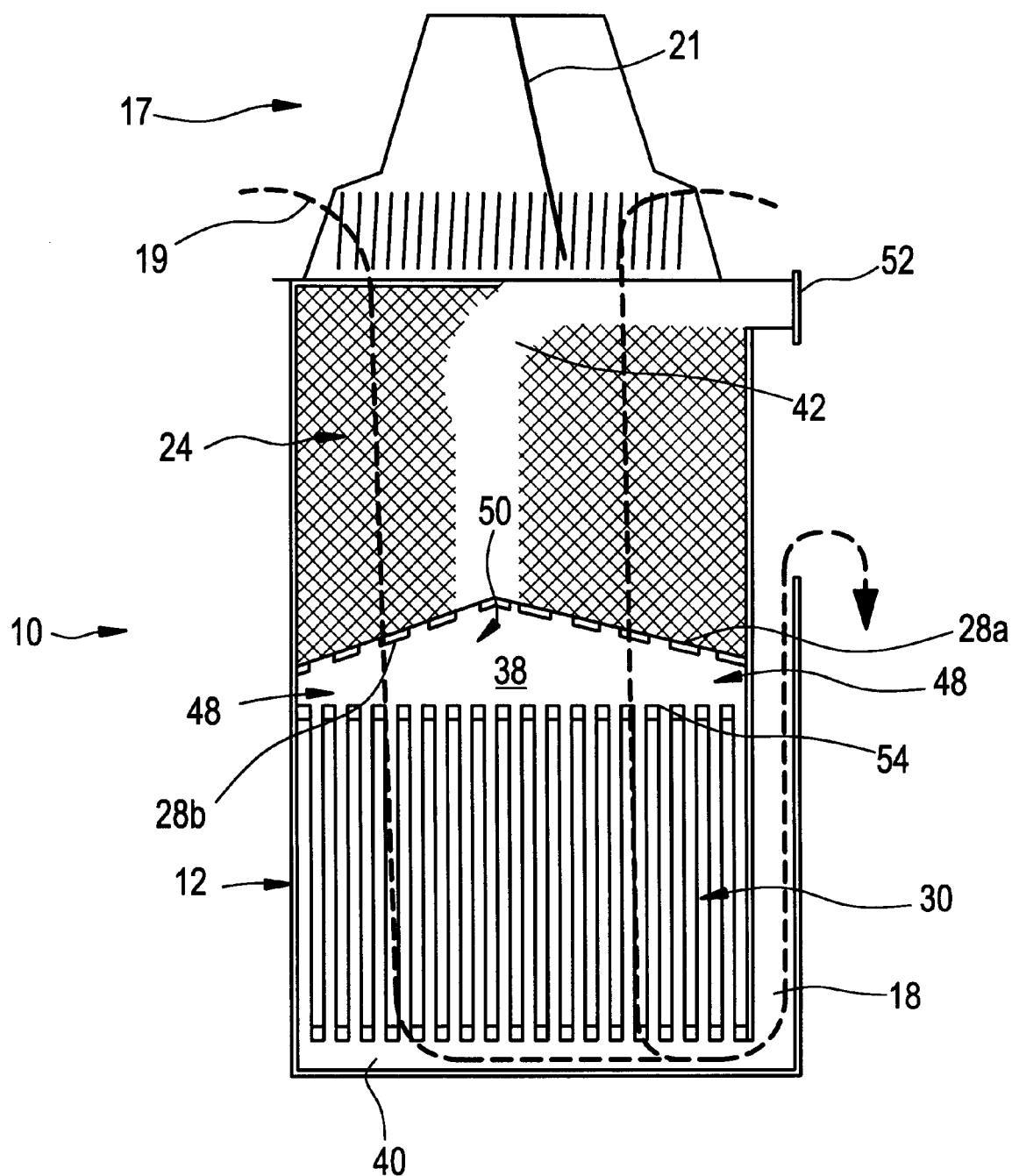
FIG. 3 is a schematic side view of a filter cartridge design illustrating an embodiment of the present invention.
Figure 4:
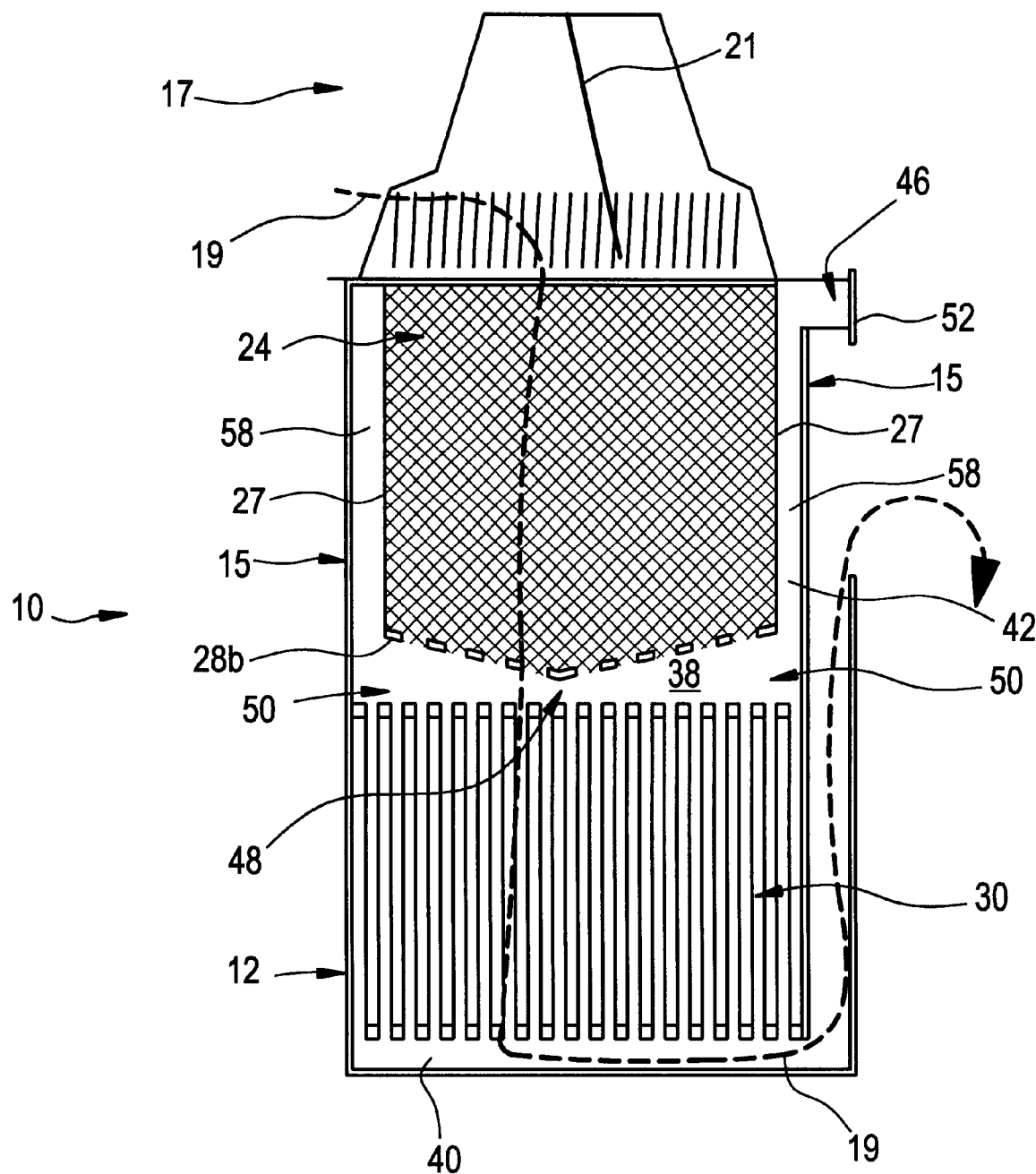
FIG. 4 is a schematic side view of a filter cartridge design illustrating an embodiment of the present invention.
Figure 5:
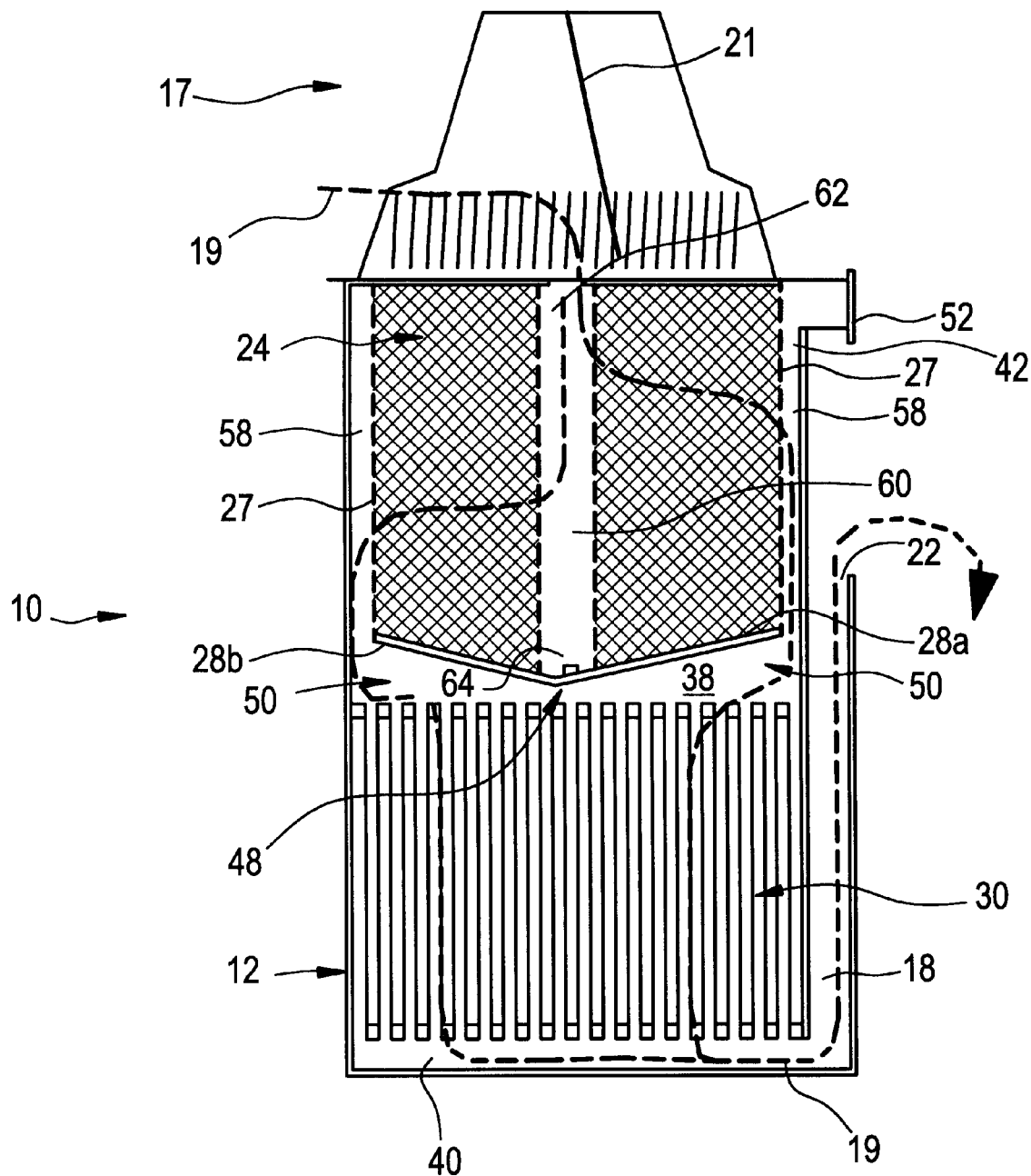
FIG. 5 is a schematic side view of a filter cartridge design in accordance with an embodiment of the present invention.

Although in all of the embodiments shown in FIGS. 1–6, both the cyst-reducing filter element 30 and the packed bed of ion-exchange resin 24 correspond in shape to the shape of the filter housing 12, which in the preferred embodiment is cylindrical in shape, other shapes will be apparent to those skilled in the art. Furthermore, although the cyst-reducing filter element 30 is shown disposed in the lower region 33 of the housing 12 with the packed bed of ion-exchange resin 24 being disposed in the upper region 31, the physical location can be reversed, as long as an air vent conduit is provided to prevent the formation of air locks within the housing 12. Moreover, as shown in FIGS. 1–6, although each of the embodiments share similar features, there are variations in each of the embodiments which promote air venting. In particular, in some of the embodiments, as shown in FIGS. 1–3, both the packed bed of ion-exchange resin 24 and the cyst-reducing filter element 30 are designed to fit snugly into the filter housing 12, that is, there is no bypass of water around the sides, whereas, FIGS. 4 and 5 show only the cyst-reducing filter element 30 fitting snugly into the filter housing 12. In addition, as shown in FIGS. 1–3 and 6, the air vent conduit 42 is disposed within the packed bed of ion-exchange resin 24 with the entry end 44 of the air vent conduit 42 opening into the first chamber 38, which allows any air bubbles that are trapped in the first chamber 38 to enter into the entry end 44 and to escape through the exit end 46 of the air vent conduit 42. Additionally, to prevent the bypassing of any untreated water containing cyst particles and to facilitate the removal of any air bubbles that are trapped in the first chamber 38, the exit end 46 of the air vent conduit 42 is positioned at some point above the water level in the water carafe when the filter is not filtering, as well as, above the treated water outlet port 22 of the gooseneck conduit 18, preferably, proximate to the top rim 14 of the filter housing 12. Moreover, although the air vent conduit 42 is shown disposed within the upper region 31 of the filter housing 12 in each of the preferred embodiments, the air vent conduit 42 may also be connected to the outside of the filter housing 12, proximate to the packed bed of ion-exchange resin 24 with the entry end 44 of the air vent conduit 42 opening into the first chamber 38. Furthermore, in all of the preferred embodiments, the exit end 46 of the air vent conduit 42 is covered with a membrane 52 that has at least one hydrophobic side facing the inside of the exit end 46 of the air vent conduit 42. Most preferably, the exit end 46 is covered with a membrane 52 where both sides are hydrophobic. This can be achieved by using a membrane 52 that is hydrophobic on both sides or by joining together the hydrophilic sides of two membranes so that one of the hydrophobic sides faces the inside of the filter housing 12 and the other of the hydrophobic sides faces the outside of the filter housing 12. Additionally, the membrane 52 is secured permanently across the exit end 46 by using a commercially available adhesive or by being thermally attached. The membrane 52 may be made of any microporous hydrophobic material that allows air to escape through the membrane 52, but prohibits water from passing through it.

Figure 6:
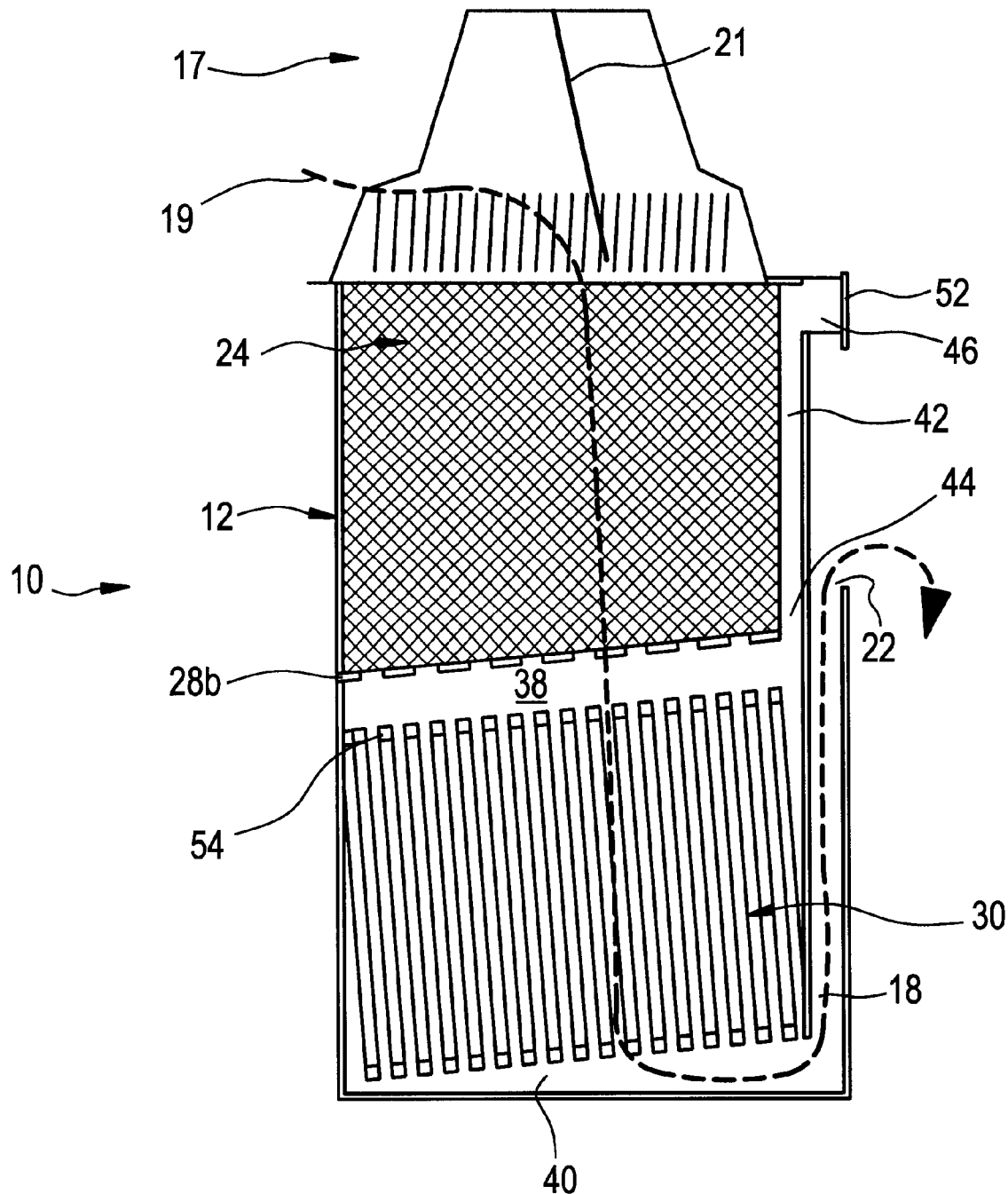
FIG. 6 is a schematic side view of a filter cartridge design in accordance with an embodiment of the present invention.
Figure 7A:
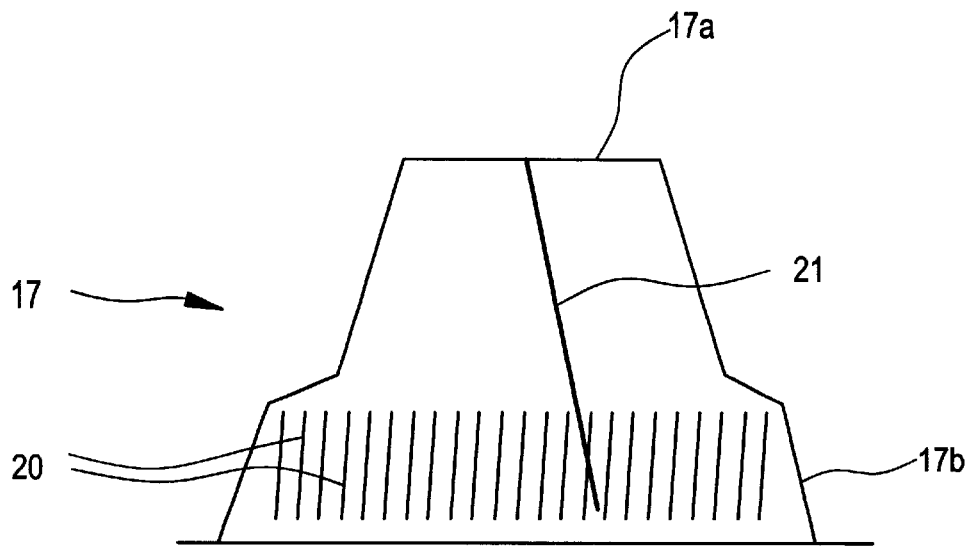
FIG. 7a is a schematic side view of a cap used with a filter cartridge design in accordance with an embodiment of the present invention.
Figure 7B:
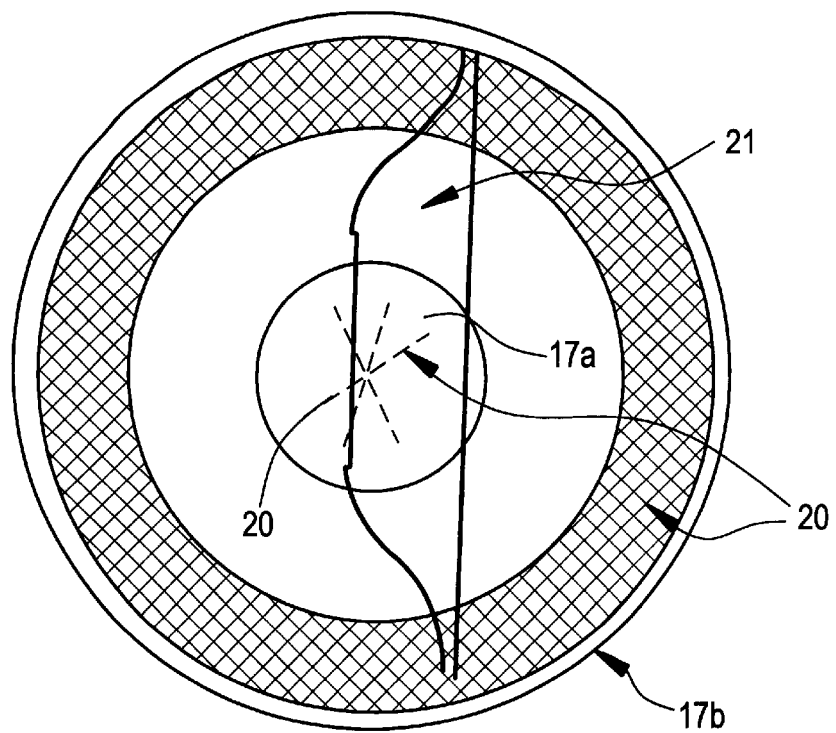
FIG. 7b is a bottom view showing the inside of the cap shown in FIG. 7a in accordance with an embodiment of the present invention.

Reference will now be made in detail to the various modifications of the filter cartridge 10 as shown in FIGS. 1–6, each of which shows a design that further facilitates the removal of any air bubbles trapped underneath the bottom screen 28 in the first chamber 38. In particular, FIG. 2 shows an embodiment of the filter cartridge 10 where the bottom screen 28 is attached at an angle to the inside of the side surface 15 of the filter housing 12. As shown in FIG. 2, the bottom screen 28 is attached at an angle with respect to the topmost surface 54 of the cyst-reducing filter element 30, thus, providing the first chamber 38 with a low area 48 underneath the ceiling 28b at one end and a high area 50 underneath the ceiling 28b at an opposite end. Further, the air vent conduit 42 is disposed within the upper region 31 and at a peripheral surface of the packed bed of ion-exchange resin 24, with the air vent conduit 42 being on the same side of the filter housing 12 as the gooseneck conduit 18. In addition, the entry end 44 of the air vent conduit 42 is positioned at the end of the ceiling 28b having the high area 50 in the first chamber 38, so that any air bubbles trapped within the first chamber 38 may enter the entry end 44 of the air vent conduit 42 and escape through the exit end 46, thus, minimizing the build up of air bubbles in the first chamber 38. Yet, in another embodiment, as shown in FIG. 6, in addition to the bottom screen 28 being attached to the filter housing 12 at an angle, the cyst-reducing filter element 30 is also secured slantingly in the filter housing 12 at a similar angle as the cyst-reducing filter element 30, so that the bottom screen 28 is substantially parallel to the topmost surface 54 of the cyst-reducing filter element 30.

Additionally, in another embodiment of the present invention, as shown in FIG. 3, the bottom screen 28 is convex in shape with respect to the topmost surface 54 of the cyst-reducing filter element 30, thus providing the first chamber 38 with a high area 50 underneath the ceiling 28b, in the middle, and a low area 48 underneath the ceiling 28b, at the periphery of the filter housing 12. Further, the air vent conduit 42 is disposed within the upper region 31 and in the middle of the ion-exchange bed of resin 24, with the entry end 44 of the air vent conduit 42 opening into the first chamber 38, at the high area 50, so that any air bubbles trapped in the first chamber 38 will rise and drift towards the entry end 44 located in the high area 50 of the air vent conduit 42 and escape through the exit end 46.

Furthermore, the embodiments of FIGS. 4 and 5 show further alternative designs of the filter cartridge 10. In particular, in FIG. 4, the packed bed of ion-exchange resin 24 is enclosed in a cylindrical resin holder 27 that is water impermeable and is smaller in circumferential size than the filter housing 12, thus, providing the filter cartridge 10 with a spatial region 58 that surrounds and separates the packed bed of ion-exchange resin 24 from the side surface 15 of the filter housing 12. Furthermore, the resin holder 27 is attached to the top rim 14 of the filter housing 12, whereas, the bottom screen 28 is attached at the periphery to the bottom of the resin holder 27. Additionally, the bottom screen 28 is water permeable and is concave in shape with respect to the topmost surface 54 of the cyst-reducing filter element, thus, providing the first chamber 38 with a low area 48 underneath the ceiling 28b, in the middle, and a high area 50 underneath the ceiling 28b, at the periphery. Also, as shown in FIG. 4, the first chamber 38 is in fluid communication with the spatial region 58, which, in essence, serves as an air vent conduit for the filter cartridge 10. Further, the spatial region 58 opens at the exit end 46 to the outside of the filter housing 12. Again, the dotted line 19 in FIG. 4 outlines the flow of the untreated water from the cap 17 through the filter cartridge 10. Basically, the configuration shown in FIG. 4 enables any air that is trapped underneath the bottom screen 28 to rise into the surrounding spatial region 58 and out through the exit end 46 of the air vent conduit 42, thus, preventing any air build up in the filter cartridge 10 that will slow down the water filtration process. A membrane 52 is attached to the air vent conduit 42.

In yet another embodiment, as shown in FIG. 5, the packed bed of ion-exchange resin 24 is bounded on the exterior by a cylindrical resin holder screen 27 that is water permeable and is attached to the top rim 14 of the filter housing 12 and at the bottom to the periphery of the bottom screen 28. The resin holder screen 27 is smaller in circumferential size than the filter housing 12, so that the filter cartridge 10 is provided with a spatial region 58 that separates the packed bed of ion-exchange resin 24 from the filter housing 12. Furthermore, the bottom screen 28 is water impermeable and is concave in shape with respect to the topmost surface 54 of the cyst-reducing filter element, thus, providing the first chamber 38 with a low area 48 underneath the ceiling 28b, in the middle, and a high area 50 underneath the ceiling 28b at the periphery. Also, as shown in FIG. 5, the first chamber 38 is in fluid communication with the spatial region 58, which, in essence, serves as an air vent conduit 42 for the filter cartridge 10. The air vent conduit 42 is covered by a hydrophobic membrane 52. The spatial region 58 opens into the exit end 46, which is proximate to the top rim 14 and faces the outside of the filter housing 12. Furthermore, the filter cartridge 10 has a water permeable screen conduit 60, which is cylindrical in the preferred embodiment, and traverses the center of the packed bed of ion-exchange resin 24. The water permeable screen conduit 60 has an open end 62 at the top that is adapted for receiving a stream of untreated water from the untreated water inlet ports 20 and an opposite closed end 64 that is proximate to the bottom screen 28. The bottom screen 28 is attached at the periphery to the bottom of the resin holder screen 27. With the exception of the open end 62 of the water permeable screen conduit 60, the ion-exchange resin 24 is impermeable to water flowing in from the top, which prevents the resin from rearranging. Once more, the dotted line 19 in FIG. 5 outlines the path of the untreated water from the cap 17 down through the filter housing 12. As shown, the untreated water enters through the untreated water inlet ports 20 and enters the packed bed of ion-exchange resin 24 through the top end 62 of the water permeable screen conduit 60. The water flows out through the side surface of the cylindrical water permeable screen conduit 60 into the packed bed of ion-exchange resin 24, and then the water flows through the resin holder screen 27 surrounding the packed bed of ion-exchange resin 24 and out into the spatial region 58. The water then passes into the first chamber 38 and enters the cyst-reducing filter element 30. The water then passes through the second chamber 40, up into the gooseneck conduit 18 and out through the treated water outlet port 22 of the filter housing 12. As the water is flowing down through the filter cartridge 10, any air that enters the filter housing 12 passes along with the water through the water permeable screen conduit 60 and out through the resin holder screen 27 surrounding the packed bed of ion-exchange resin 24 and into the spatial region 58. Once the air reaches the spatial region 58, the air eventually rises and escapes the filter housing 12 through the exit end 46, which is accessible through the spatial region 58.

With respect to the cyst-reducing filter element 30, although in each of the preferred embodiments the cyst-reducing filter element 30 is a cellular honeycomb structure, the cyst-reducing filter element 30 may be formed of any of a variety of different micro-porous materials that offer porosity sufficiently fine to provide effective cyst reduction. More importantly, the micro-porous cyst-reducing filter element 30 must offer a high surface area in order to ensure adequate water filtration rates under gravity conditions alone. For instance, in the present invention, the cyst-reducing filter element 30 achieves cyst reduction mainly due to the characteristics of the walls 37 of the channels 32 that traverse the cyst-reducing filter element 30. More specifically, the walls 37 of the channels 32 are configured to have a porosity characterized by a median pore diameter of less than 6 microns (as measured by mercury intrusion), and a primed water flux of at least about 10 ml/min/cm$^3$ under a water pressure of 0.3 psig. Some desirable materials that the cyst-reducing filter element 30 may be formed of include porous ceramics, porous carbon, composite materials of organic/organic, organic/inorganic, inorganic/inorganic composition and polymer or molecular sieve membranes, each of which can provide at least 99.95% removal of 3–4 μm particles when tested in accordance with NSF standard 53, Drinking Water Treatment Units—Health Effects (September 1997). In particular, the micro-porous filters known to be effective for cyst reduction during water filtration are ceramic honeycomb filters, carbon-based honeycomb filters, fiber mat filters incorporating glass, ceramic and/or polymer fibers, and pleated polymer membrane filters. In a preferred embodiment, the cyst-reducing filter element 30 is a cellular ceramic honeycomb structure that further consists of more than 15% by weight of activated carbon. Alternatively, the cellular ceramic honeycomb structure can be coated with carbon.

In all of the preferred embodiments, the various parts of the filter housing 12, including the cap 17, the gooseneck conduit 18, the baffle plate 21, and the air vent conduit 42, are made of an injection moldable plastic material. Further, in each of the various embodiments where the bottom screen 28, the resin holder screen 27 and the water permeable screen conduit 60 are permeable to water, these screens are made of a plastic such as polyester or other suitable materials. Where the bottom screen 28 and the resin holder screen 27 are impermeable to water, these screens do not contain holes, and, thus, water is prohibited from passing through these screens. Moreover, in all of the preferred embodiments, the membrane 52 used is a material sold under the brand name of GORE-TEX®, however, other substitute materials for the membrane 52 will be apparent to those skilled in the art. The attachment of the various elements to the filter housing 12 is accomplished by using a commercially available waterproof adhesive. In all of the preferred embodiments, the packed bed of ion-exchange resin 24 used is a resin mixture containing a macroporous weak acid cation exchange resin capable of removing unwanted ions.

Figure 9:
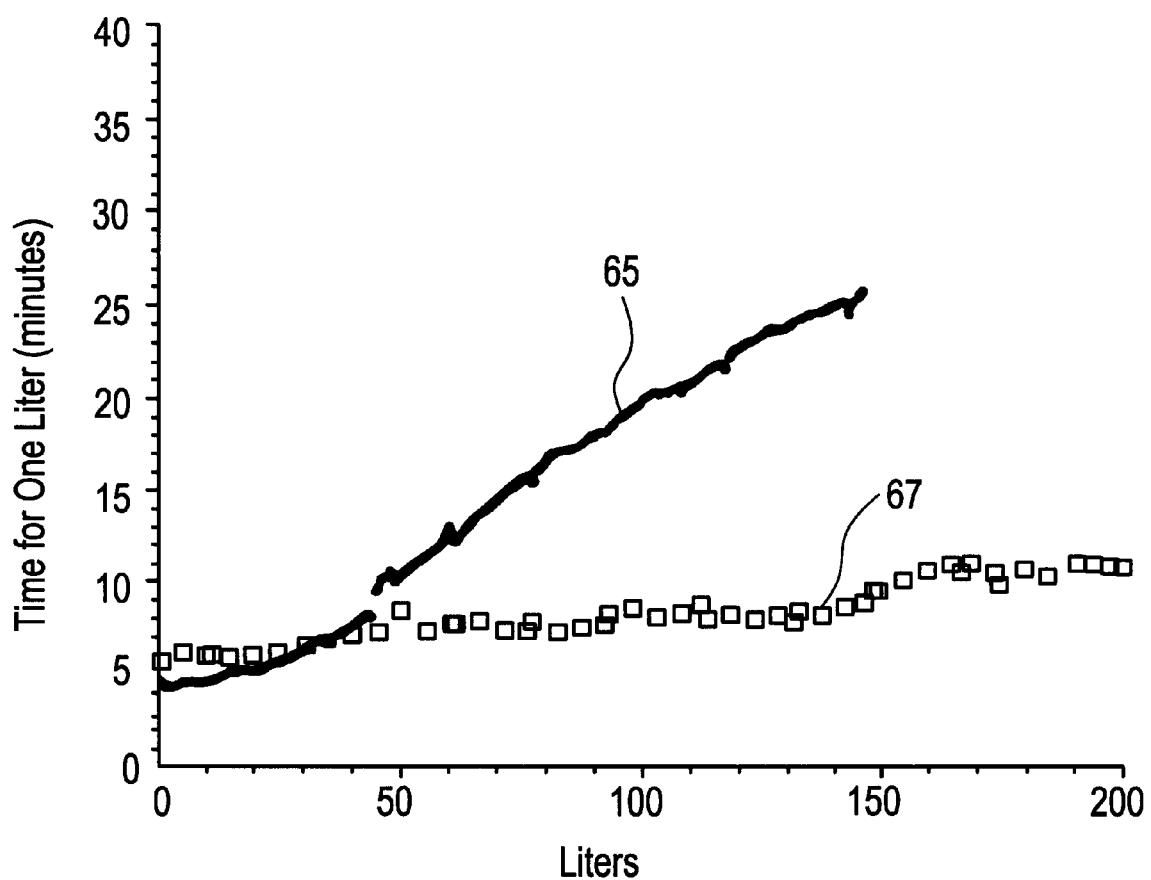
FIG. 9 is a graph plotting the performance of a water filter carafe having an unvented filter cartridge versus a water filter carafe having a vented filter cartridge in accordance with an embodiment of the present invention.

Finally, FIG. 9 shows the results of an experiment carried out to compare the performances of a water filter carafe having an unvented filter cartridge design versus a water filter carafe having a vented filter cartridge design in accordance with an embodiment of the present invention. In particular, both the carafes utilized a filter cartridge design in accordance with the embodiment of the invention shown in FIG. 1, with the exception being that the unvented water filter carafe did not have an air vent conduit as shown. In particular, both cartridge housings were made from clear PVC, with an approximate 2.25" diameter and an approximate length of 4", and the air vent conduit was approximately 0.25". Further, both cartridge housings included polyester screen materials, and further included approximately 5 cubic inches of an ion-exchange resin mixture sold by The Dow Chemical Company of Midland, Mich. under the brand name and model number of DOWEX® MAC-3. The cyst filter was an active carbon impregnated and plugged ceramic honeycomb structure having approximately 300 cells per cubic inch. In carrying out the experiment, both the vented and unvented water filter carafes were filled with a liter of water and the time it took to filter the liter of water was measured in minutes. This procedure was repeated twenty times per day for each of the water filter carafes. As shown in FIG. 9, the unvented filter carafe plot, designated by the numeral 65, showed an increase in the time it took for the water to be filtered after about 45 liters of water were filtered through the unvented filter cartridge. However, the vented filter carafe plot, designated by the numeral 67, surprisingly showed unexpected stable performance of filtering water in under 10 minutes even after over 150 liters of water were filtered through the vented filter cartridge. Both filters had a cyst filtration efficiency in excess of 99.95% and a chlorine removal efficiency in excess of 97%.

Although a preferred embodiment of this invention and certain variations thereof have been described herein, various modifications and variations will be apparent to those skilled in the art without departing from the spirit or scope of the invention. Thus, it is intended that the present invention cover the modifications and variations of this invention provided they come within the scope of the appended claims and their equivalents.

What is claimed is:

1. A replaceable gravity-flow cyst-reducing water filter cartridge, comprising:

a filter cartridge housing comprising a top rim, a side surface, a bottom surface, and a cap sealingly attached to said top rim, said cap having a plurality of untreated water inlet ports, said filter housing further comprising:

a gooseneck conduit connected to a lower region of said filter housing, said gooseneck conduit having at one end a treated water outlet port that opens into said side surface of said filter housing;

a high surface area cyst-reducing filter element providing at least 99.95% removal of 3–4 μm particles when tested in accordance with NSF standard 53, Drinking Water Treatment Units—Health Effects (September 1997), said cyst-reducing filter element being disposed within said filter housing; a bottom screen disposed within said filter housing, said bottom screen being attached at the periphery to said side surface of said housing;

a packed bed of ion-exchange resin disposed within said filter housing, wherein a bottom surface of said packed bed of ion-exchange resin is in full contact with one side of said bottom screen;

a first chamber separating said packed bed of ion-exchange resin and said cyst-reducing filter element;

a second chamber proximate to said bottom surface of said filter housing, said second chamber being in fluid communication with the end opposite said treated water outlet port of said gooseneck conduit and said treated water outlet port of said gooseneck conduit being positioned above the level of said first chamber; and an air vent conduit having an entry end and an exit end, said air vent conduit being connected to said upper region of said filter housing, said entry end of said air vent conduit opening into said first chamber, said exit end of said air vent conduit opening to the outside of said side surface of said filter housing, said exit end being positioned above the treated water outlet port of said gooseneck conduit.

2. The replaceable gravity-flow cyst-reducing water filter cartridge of claim 1, wherein said packed bed of ion-exchange resin is disposed within said upper region and proximate to said top rim of said filter housing, and wherein said cyst-reducing filter element is secured within said lower region and proximate to said bottom surface of said filter housing.

3. The replaceable gravity-flow cyst-reducing water filter cartridge of claim 1, wherein said high surface area cyst-reducing filter element further comprises a cellular honeycomb structure having a plurality of channels separated by porous channel walls, wherein said channels traverse said cyst-reducing filter element from a filter inlet end to a filter outlet end, and include a first plurality of channels open only at said inlet end and a second plurality of channels open only at said outlet end.

4. The replaceable gravity-flow cyst-reducing water filter cartridge of claim 1, wherein said exit end of said air vent conduit further comprises a membrane having at least one hydrophobic side facing the inside of said filter housing.

5. A replaceable gravity-flow cyst-reducing water filter cartridge, comprising:

a filter cartridge housing comprising a top rim, a side surface, a bottom surface, and a cap sealingly attached to said top rim, said cap having a plurality of untreated water inlet ports, said filter housing further comprising:

a gooseneck conduit connected to a lower region of the filter housing, the gooseneck conduit having at one end a treated water outlet port that opens into the side surface of the filter housing; a high surface area cyst-reducing filter element providing at least 99.95% removal of 3–4 $\mu$m particles when tested in accordance with NSF standard 53, Drinking Water Treatment Units—Health Effects (September 1997), the cyst-reducing filter element being disposed within the filter housing;

a bottom screen disposed within the filter housing, the bottom screen being attached at the periphery to the side surface of the housing;

a packed bed of ion-exchange resin disposed within the filter housing, wherein a bottom surface of the packed bed of ion-exchange resin is in full contact with one side of the bottom screen;

a first chamber separating the packed bed of ion-exchange resin and the cyst-reducing filter element;

a second chamber proximate to the bottom surface of the filter housing, the second chamber being in fluid communication with the end opposite the treated water outlet port of the gooseneck conduit; and an air vent hole in said side wall and proximate to said top rim of said filter housing, said hole opening into and being in fluid communication with said first chamber, said hole being sealed with at least one membrane having at least one hydrophobic side facing the inside of said filter housing; wherein an opposite side of said bottom screen forms a ceiling at the top of said first chamber, and wherein said treated water outlet port of said gooseneck conduit is positioned above the level of said first chamber.

6. A replaceable gravity-flow cyst-reducing water filter cartridge, comprising:

a filter cartridge housing comprising a top rim, a side surface, a bottom surface, and a cap sealingly attached to said top rim, said cap having a plurality of untreated water inlet ports, said filter housing further comprising:

a gooseneck conduit connected to a lower region of said housing, said gooseneck conduit having at one end a treated water outlet port that opens into said side surface of said filter housing;

a high surface area cyst-reducing filter element providing at least 99.95% removal of 3–4 $\mu$m particles when tested in accordance with NSF standard 53, Drinking Water Treatment Units—Health Effects (September, 1997), said cyst-reducing filter element being secured within said lower region and proximate to said bottom surface of said filter housing;

a bottom screen disposed within an upper region of said housing and above said filter element, said bottom screen being attached at the periphery to said side surface of said housing;

a packed bed of ion-exchange resin disposed within said upper region and proximate to said top rim of said filter housing, wherein said packed bed of ion-exchange resin is bounded at the top by said cap of said filter housing, and wherein a bottom surface of said packed bed of ion-exchange resin is in full contact with one side of said bottom screen;

a first chamber separating said packed bed of ion-exchange resin and said cyst-reducing filter element, said first chamber being bounded at the top by an opposite side of said bottom screen, said opposite side of said bottom screen forming a ceiling at the top of said first chamber;

a second chamber separating said cyst-reducing filter element and said bottom surface of said filter housing, said second chamber being in fluid communication with the end opposite said treated water outlet port of said gooseneck conduit and said treated water outlet port of said gooseneck conduit being positioned above the level of said first chamber; and an air vent conduit having an entry end and an exit end, said air vent conduit being connected to said upper region of said filter housing, said entry end of said air vent conduit opening into said first chamber, said exit end of said air vent conduit facing the outside of said side surface of said filter housing, said exit end being positioned above the treated water outlet port of said gooseneck conduit.

7. The replaceable gravity-flow cyst-reducing water filter cartridge of claim 6, wherein said high surface area cyst-reducing filter element further comprises a cellular honeycomb structure having a plurality of channels separated by porous channel walls, wherein said channels traverse said cyst-reducing filter element from a filter inlet end to a filter outlet end, and include a first plurality of channels open only at said inlet end and a second plurality of channels open only at said outlet end.

8. The replaceable gravity-flow cyst-reducing water filter cartridge of claim 7 wherein said cellular honeycomb structure is made of ceramic.

9. The replaceable gravity-flow cyst-reducing water filter cartridge of claim 7 wherein said cellular honeycomb structure further comprises activated carbon.

10. The replaceable gravity-flow cyst-reducing water filter cartridge of claim 6, wherein said packed bed of ion-exchange resin occupies the space between said bottom screen and a horizontal plane at the level of said top rim of said housing, and wherein said cyst-reducing filter element corresponds in shape to the shape of said filter housing and fits snugly into said filter housing.

11. The replaceable gravity-flow cyst-reducing water filter cartridge of claim 6, wherein said air vent conduit is disposed within and adjacent to said packed bed of ion-exchange resin in said upper region of said filter housing.

12. The replaceable gravity-flow cyst-reducing water filter cartridge of claim 6, wherein said bottom screen is substantially parallel to said cyst-reducing filter element.

13. The replaceable gravity-flow cyst-reducing water filter cartridge of claim 6, wherein said treated water outlet port of said gooseneck conduit is positioned at least about one centimeter above said topmost surface of said cyst-reducing filter element.

14. The replaceable gravity-flow cyst-reducing water filter cartridge of claim 6, wherein said exit end of said air vent conduit further comprises a membrane having at least one hydrophobic side facing the inside of said filter housing.

15. The replaceable gravity-flow cyst-reducing water filter cartridge of claim 6, wherein said exit end of said air vent conduit further comprises two membranes, each having a hydrophilic side and a hydrophobic side, wherein each of said hydrophilic sides are joined together whereby one of said hydrophobic sides faces the inside of said filter housing and the other of said hydrophobic sides faces the outside of said filter housing.

16. The replaceable gravity-flow cyst-reducing water filter cartridge of claim 6, wherein said exit end of said air vent conduit further comprises a membrane having two hydrophobic sides.

17. The replaceable gravity-flow cyst-reducing water filter cartridge of claim 6, wherein said untreated water inlet ports of said cap are located on a raised top surface and on a side skirt extending therefrom, said cap further comprising a baffle plate attached to the inside of said raised top surface of said cap, wherein approximately half the number of said untreated water inlet ports are located on each side of said baffle plate.

18. The replaceable gravity-flow cyst-reducing water filter cartridge of claim 6, wherein said bottom screen is attached at an angle to said side surface of said housing, said bottom screen providing said first chamber with a low area underneath said ceiling at one end and a high area underneath said ceiling at an opposite end, and wherein said air vent conduit is disposed within said upper region and at a peripheral surface of said packed bed of ion-exchange resin, said air vent conduit being on the same side of the filter housing as said gooseneck conduit and wherein said entry end of said air vent conduit opens into said high area underneath said ceiling of said first chamber.

19. The replaceable gravity-flow cyst-reducing water filter cartridge of claim 9, wherein said cyst-reducing filter element is secured slantingly at said angle to said side surface of said housing.

20. The replaceable gravity-flow cyst-reducing water filter cartridge of claim 6, wherein said bottom screen has a convex shape with respect to said topmost surface of said cyst-reducing filter element, said bottom screen providing said first chamber with a high area underneath said ceiling in the middle and a low area underneath said ceiling at the periphery, and wherein said air vent conduit is disposed in the middle of said packed bed of ion-exchange resin, said entry end of said air vent conduit opening into said high area underneath said ceiling of said first chamber.

21. A replaceable gravity-flow cyst-reducing water filter cartridge, comprising:

a filter cartridge housing comprising a top rim, a side surface, a bottom surface, and a cap sealingly attached to said top rim, said cap having a plurality of untreated water inlet ports, said filter housing further comprising:

a gooseneck conduit being attached to a lower region of said housing, said gooseneck conduit having at one end a treated water outlet port that opens into said side surface of said filter housing;

a cellular honeycomb cyst-reducing filter element secured within said lower region and proximate to said bottom surface of said filter housing, said cyst-reducing filter element comprising a plurality of channels separated by porous channel walls, wherein said channels traverse said element from a filter inlet end to a filter outlet end, and include a first plurality of channels open only at said inlet end and a second plurality of channels open only at said outlet end, said cyst-reducing filter element providing at least 99.95% removal of 3–4 $\mu$m particles when tested in accordance with NSF standard 53, Drinking Water Treatment Units—Health Effects (September 1997);

a bottom screen disposed within an upper region of said housing and above said cyst-reducing filter element;

a packed bed of ion-exchange resin attached to an upper region and proximate to said top rim of said filter housing, wherein a topmost surface of said packed bed of ion-exchange resin is bounded by said cap of said filter housing, and wherein a bottom surface of said packed bed of ion-exchange resin is in full contact with one side of said bottom screen, said packed bed of ion-exchange resin being smaller in circumferential size than said filter housing;

a first chamber surrounding said packed bed of ion-exchange resin within said upper region of said filter housing, said first chamber separating said packed bed of ion-exchange resin and said cyst-reducing filter element;

a second chamber separating said cyst-reducing filter element and said bottom surface of said filter housing, said second chamber being in fluid communication with the end opposite said treated water outlet port of said gooseneck conduit; and an air vent hole in said side wall and proximate to said top rim of said filter housing, said hole opening into and being in fluid communication with said first chamber, said hole being sealed with at least one membrane having at least one hydrophobic side facing the inside of said filter housing; wherein an opposite side of said bottom screen forms a ceiling at the top of said first chamber, and wherein said treated water outlet port of said gooseneck conduit is positioned above the level of said first chamber.

22. The replaceable gravity-flow cyst-reducing water filter cartridge of claim 21, wherein said bottom screen is concave in shape with respect to said topmost surface of said cyst-reducing filter element, said bottom screen providing said first chamber with a low area underneath said ceiling in the middle and a high area underneath said ceiling at the periphery.

23. The replaceable gravity-flow cyst-reducing water filter cartridge of claim 21, wherein said bottom screen is substantially parallel to said cyst-reducing filter element and wherein said untreated water inlet ports of said cap are located on a raised top surface and along the bottom periphery of a side skirt extending therefrom, said cap further comprising a baffle plate attached across the inside of said raised top surface of said cap, said baffle plate being parallel to said skirt of said cap.

24. The replaceable gravity-flow cyst-reducing water filter cartridge of claim 21, wherein said treated water outlet port of said gooseneck conduit is positioned at least about one centimeter above said topmost surface of said cyst-reducing filter element.

25. The replaceable gravity-flow cyst-reducing water filter cartridge of claim 21, wherein said cyst-reducing filter element corresponds in shape to the shape of said filter housing and fits snugly into said filter housing.

26. The replaceable gravity-flow cyst-reducing water filter cartridge of claim 21, wherein said cellular honeycomb cyst-reducing filter element is made of ceramic.

27. The replaceable gravity-flow cyst-reducing water filter cartridge of claim 21, wherein said packed bed of ion-exchange resin is surrounded by a resin holder screen that is water impermeable, said resin holder screen being attached to said housing, and wherein said bottom screen is attached at the periphery to the bottom of said resin holder screen, said bottom screen being water permeable.

28. The replaceable gravity-flow cyst-reducing water filter cartridge of claim 21, wherein said packed bed of ion-exchange resin is surrounded by a resin holder screen that is water permeable, said resin holder screen being attached to said housing; and wherein said filter cartridge further comprises a water permeable screen conduit traversing the center of said packed bed of ion-exchange resin, wherein said water permeable screen conduit has an open end at the top that is adapted for receiving a stream of untreated water and an opposite closed end that is proximate to said bottom screen, and wherein said bottom screen is attached at the periphery to the bottom of said resin holder screen, said bottom screen being water impermeable.

29. A replaceable gravity-flow cyst-reducing water filtration device, comprising:
a water filter carafe having a pour spout;
a water filter cartridge, said filter cartridge being mounted in a receptacle located in an untreated water reservoir of said filter carafe, said filter cartridge further comprising:
a filter cartridge housing comprising a top rim and a bottom surface, said top rim being sealed by a cap having a plurality of untreated water inlet ports that are located on a raised top surface and on a skirt extending therefrom, said cap being in fluid communication with said untreated water reservoir of said filter carafe, said filter housing further comprising:
a gooseneck conduit connected to a lower region of said housing, said gooseneck conduit having at one end a treated water outlet port that opens into said side surface of said filter housing;
a cellular ceramic honeycomb cyst-reducing filter element having a plurality of channels separated by porous channel walls, wherein said channels traverse said cyst-reducing filter element from a filter inlet end to a filter outlet end, and include a first plurality of channels open only at said inlet end and a second plurality of channels open only at said outlet end, said cyst-reducing filter element providing at least 99.95% removal of 3–4 $\mu$m particles when tested in accordance with NSF standard 53, Drinking Water Treatment Units—Health Effects (September 1997), said cyst-reducing filter element being secured within said lower region and proximate to said bottom surface of said filter housing;
a bottom screen disposed within an upper region of said housing and above said filter element, said bottom screen being attached at the periphery to said side surface of said housing;
a packed bed of ion-exchange resin disposed within an upper region and proximate to said top rim of said filter housing, wherein a topmost surface of said packed bed of ion-exchange resin is bounded by said cap of said filter housing, and wherein a bottom surface of said packed bed of ion-exchange resin is in full contact with one side of said bottom screen;
a first chamber separating said packed bed of ion-exchange resin and said cyst-reducing filter element;
a second chamber separating said cyst-reducing filter element and said bottom surface of said filter housing, said second chamber being in fluid communication with the end opposite said treated water outlet port of said gooseneck conduit and said treated water outlet port of said gooseneck conduit being positioned above the level of said first chamber; and
an air vent conduit having an entry end and an exit end, said air vent conduit being connected to said upper region of said filter housing, said air vent conduit having an entry end opening into said first chamber and an exit end proximate to said top rim of said filter housing, said exit end being positioned outside and above said treated water outlet port of said gooseneck conduit of said filter housing;
wherein said cyst-reducing filter element corresponds in shape to the shape of said filter housing, and wherein said air vent conduit further comprises at least one membrane having at least one hydrophobic side facing the inside of said filter housing.

30. The replaceable gravity-flow cyst-reducing water filtration device of claim 29, wherein said packed bed of ion-exchange resin occupies the space between said bottom screen and a horizontal plane at the level of said top rim of said housing, and wherein said cyst-reducing filter element fits snugly into said filter housing.

31. The replaceable gravity-flow cyst-reducing water filtration device of claim 29, wherein said air vent conduit is disposed within and proximate to said packed bed of ion-exchange resin in said upper region of said filter housing.

32. The replaceable gravity-flow cyst-reducing water filtration device of claim 29, wherein said honeycomb cyst-reducing filter element comprises activated carbon.

33. The replaceable gravity-flow cyst-reducing water filtration device of claim 29, wherein said bottom screen is substantially parallel to said cyst-reducing filter element, and wherein said cap further comprising a baffle plate attached to the inside of said raised top surface of said cap, wherein approximately half the number of said untreated water inlet ports are located on each side of said baffle plate.

34. The replaceable gravity-flow cyst-reducing water filtration device of claim 29, wherein said bottom screen is attached at an angle to said side surface of said housing, said bottom screen providing said first chamber with a low area underneath said ceiling at one end and a high area underneath said ceiling at an opposite end, and wherein said entry end of said air vent conduit opens into said high area underneath said ceiling of said first chamber.

35. The replaceable gravity-flow cyst-reducing water filtration device of claim 34, wherein said cyst-reducing filter element is secured slantingly at said angle of said bottom screen in said filter housing.

36. The replaceable gravity-flow cyst-reducing water filtration device of claim 29, wherein said bottom screen has a convex shape with respect to said topmost surface of said cyst-reducing filter element, said bottom screen providing said first chamber with a high area underneath said ceiling in the middle and a low area underneath said ceiling at the periphery, and wherein said air vent conduit is disposed in the middle of said packed bed of ion-exchange resin, said entry end of said air vent conduit opening into said high area underneath said ceiling of said first chamber.

37. The replaceable gravity-flow cyst-reducing water filtration device of claim 29, wherein each of said exit end of said air vent conduit and said treated water outlet port of said gooseneck conduit is positioned on an opposite side of said filter carafe from said pour spout.

* * * * *